(12) United States Patent
Shin

(10) Patent No.: US 7,944,629 B2
(45) Date of Patent: May 17, 2011

(54) CAMERA LENS ASSEMBLY

(75) Inventor: Doo-Sik Shin, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 12/693,173

(22) Filed: Jan. 25, 2010

(65) Prior Publication Data
US 2010/0208369 A1    Aug. 19, 2010

(30) Foreign Application Priority Data

Feb. 16, 2009 (KR) .................. 10-2009-0012374

(51) Int. Cl.
*G02B 7/02* (2006.01)
(52) U.S. Cl. ....................................... 359/811; 359/819
(58) Field of Classification Search .................. 359/811, 359/819
See application file for complete search history.

(56) References Cited

U.S. PATENT DOCUMENTS
7,589,920 B2    9/2009   Shin et al.
2006/0007351 A1*  1/2006   Choi et al. .................... 348/374

FOREIGN PATENT DOCUMENTS
KR           100665282       12/2006

* cited by examiner

*Primary Examiner* — Ricky L Mack
*Assistant Examiner* — James C Jones
(74) *Attorney, Agent, or Firm* — The Farrell Law Firm, P.C.

(57) ABSTRACT

Disclosed is a camera lens assembly that enables a lens assembly mounted in a digital camera, a mobile communication terminal or the like to be supported in an initial position and to be movable in the direction of an optical axis when the lens assembly is driven. The camera lens assembly includes a lens assembly, a housing for receiving the lens assembly, a driving part retained in the housing for driving the lens assembly in the direction of the optical axis, and one or more resilient supporting parts coupled with the lens assembly for supporting the lens assembly in the housing, wherein the supporting part is elastically deformed when the lens assembly moves in the direction of the optical axis, and wherein the resilient supporting part restores the lens assembly to its initial position.

12 Claims, 7 Drawing Sheets

CAMERA LENS ASSEMBLY

PRIORITY

This application claims priority under 35 U.S.C. §119(a) to an application entitled "Camera Lens Assembly" filed in the Korean Industrial Property Office on Feb. 16, 2009 and assigned Serial No. 10-2009-0012374, the contents of which are hereby incorporated by reference.

BACKGROUND OF THE INVENTION

1. Field of the Invention

The present invention relates to a camera lens assembly, and more particularly to a camera lens assembly that enables a lens assembly installed in a digital camera, a mobile communication terminal or the like to be supported in an initial position and to be displaceable in the direction of an optical axis when the lens assembly is driven.

2. Description of the Related Art

With the recent developments in manufacturing technology of digital cameras, a miniaturized and light-weight camera lens assembly has been introduced, and a camera device has been installed in a mobile communication terminal. A mobile communication terminal equipped with an optical lens and a camera device is generally becoming very popular.

The performance of the camera device installed in the mobile communication terminal at the initial stage, when the camera device began to be installed in mobile communication terminals, was at a much lower level as compared with that of a digital camera which was already commercialized at that time. For example, the performance of the digital camera of a cheap model was generally four megapixels, while the performance of the camera device installed in a mobile communication terminal was typically 300 thousands pixels, and a camera device installed in a deluxe model mobile communication terminal was generally not more than one megapixel.

However, in recent years it has become popular to install a camera device with one megapixel in mobile communication terminals. For the deluxe model mobile communication terminal a camera device having three megapixels has been installed, which corresponds to performance of a cheap model digital camera. A mobile communication terminal having a camera device with the performance of more than seven megapixels has now been commercialized. As such, the improvement in a camera function of the mobile communication terminal is owed to the improvement in the precision of manufacturing technologies of the camera lens assembly.

The focal length of a camera lens module refers to a distance between a lens and an imaging surface, which will vary based upon the distance between the lens and an object to be photographed. Therefore, in order to obtain the best resolution of images, it is required to vary the distance between the lens module and an image sensor depending on the distance to the object to be photographed. Particularly, in a case where a high quality image with high resolution is required, it is necessary to install a device for compensating the focal length. A device for performing such a compensation of the focal length may be divided into two types: a manual focus compensation device in which a user manually corrects the focal length, and an automatic focus compensation device in which the focal length is automatically corrected by a device provided in the lens module.

FIG. 1 is a schematic sectional view illustrating a state where the focal length is corrected according to the movement of the lens module of a conventional camera lens assembly. FIG. 2 is a schematic sectional view illustrating a state where the focal length is corrected according to the movement of a lens in the lens module of the conventional camera lens assembly.

As shown in FIG. 1, when a lens module 11 is displaceable in its entirety in a camera lens assembly 10, there is no change in the structure of the lens module 11. Therefore, since there is no change in the characteristics of an optical system except for the change of the focal length according to the movement of the lens module 11, this construction is usually adopted and used in the structure of the camera assembly 10 having a simple construction.

However, a camera assembly 10 has recently been provided with a variety of additional functions such as an electric-powered shutter or an optical zoom, so that the interconnection within the camera lens module 11 becomes more complicated. Accordingly, it becomes difficult to drive the lens module 11 as a whole unit. Furthermore, since the lens module 11 has to be driven in its entirety, it has a drawback in that a driving force is needed to drive the lens module 11.

In order to solve the above drawbacks, there has been adopted a method in which at least one of the lenses provided in the lens module 21 of the camera lens assembly 20 is driven so as to vary the focal length, as shown in FIG. 2. In this manner, it is advantageous in that such a method requires relatively less driving force since at least one of the lenses 22 provided in the lens module 21 needs to be driven.

However, this still has drawbacks in that the optical characteristics such as an optical magnification rate may be changed upon the movement of the lens 22 because at least one of the lenses 22 provided in the lens module 21 needs driving.

Further, since a drive mechanism for driving the lens has to be inserted within the lens module, it is difficult to miniaturize the drive mechanism when it is to be installed in a portable terminal, a small camera or the like.

Meanwhile, another method for driving the camera lens module is disclosed in Korean Patent Application No. 2007-35155 filed on Apr. 10, 2007 by the assignee of this invention.

As shown in FIG. 3, the camera lens module 30 includes a driving part 34. The driving part 34 is installed on one side of a lens module 33 so that the lens module 33 can be displaceable back and forth in the direction of an optical axis O. A guiding part is provided between the lens module 33 and the driving part 34. The lens module 33 includes at least one lens therein and adjusts the focal length of the lens while moving back and forth in the direction of the optical axis O. The lens module 33 is supported by an upper and a lower leaf spring 35 provided within a housing 31. A magnetic substance 34a is mounted on one side of the lens module 3. The magnetic substance 34a faces a coil 34b provided at one side of the housing 31 and cooperates with the coil 34b to produce a driving force to move the lens module 33 back and forth. When an electric current is applied to the coil 34b, the coil 34b generates an electric field. The electric field generated by the coil 34b and the magnetic field of the magnetic substance 34a cooperate with each other, so that they produce a driving force to push or retract the lens module 33.

The camera lens assembly described above has a complicated structure since the leaf spring is secured to the housing. In addition, a distortion is generated when the position of the camera lens assembly is altered or an impact is exerted thereto. It also has a drawback that the housing becomes bigger since a space for mounting and moving the leaf spring should be provided at an upper and lower side of the lens assembly in order to install the leaf spring.

As such, there has been a need to develop a camera lens assembly that can be miniaturized for a mobile communication device, portable electronic equipment or the like in accordance with current trends of making such devices thinner.

Furthermore, as for a camera lens assembly installed in a mobile communication device or the like, there has been a need to develop a camera lens assembly that can support the lens assembly in an initial position within the housing when not driven, while it can not only be resiliently deformed according to the movement of the lens assembly in the direction of the optical axis, but also be designed to restore the lens assembly to its initial position when driven.

SUMMARY OF THE INVENTION

Accordingly, the present invention has been made to solve the above-mentioned problems occurring in the prior art, and the present invention provides a camera lens assembly that enables a lens assembly mounted in a digital camera, a mobile communication terminal or the like to be supported in an initial position and to be displaceable in the direction of an optical axis when the lens assembly is driven.

In addition, the present invention provides a camera lens assembly capable of maintaining a constant gap between an image sensor and a lens assembly and further fixing the position of the lens assembly despite a position change of the camera lens assembly.

In accordance with an aspect of the present invention, there is provided a camera lens assembly including a lens assembly; a housing for receiving the lens assembly; a driving part retained in the housing for driving the lens assembly in the direction of an optical axis; and one or more resilient supporting parts for supporting the lens assembly in the housing, wherein the resilient supporting part is elastically deformed when the lens assembly moves in the direction of the optical axis, and wherein the resilient supporting part restores the lens assembly to its initial position.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Figure 1:
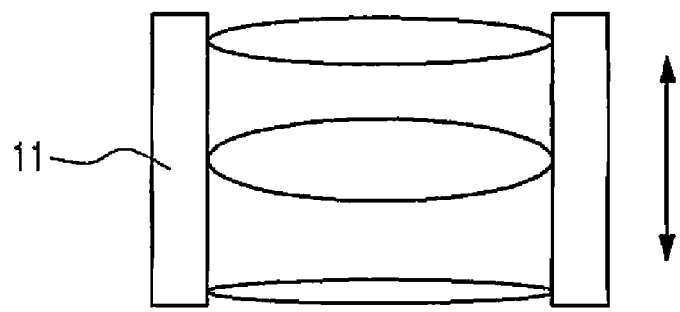
FIG. 1 is a schematic sectional view illustrating a lens module of a camera lens assembly in accordance with the prior art.
Figure 2:
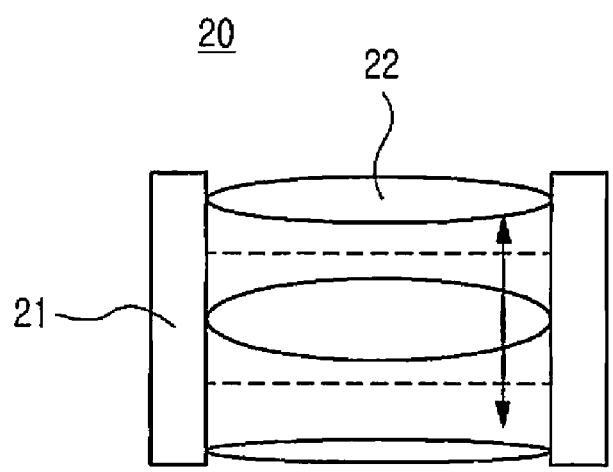
FIG. 2 is a schematic sectional view illustrating another lens module of a camera lens assembly in accordance with the prior art.
Figure 3:
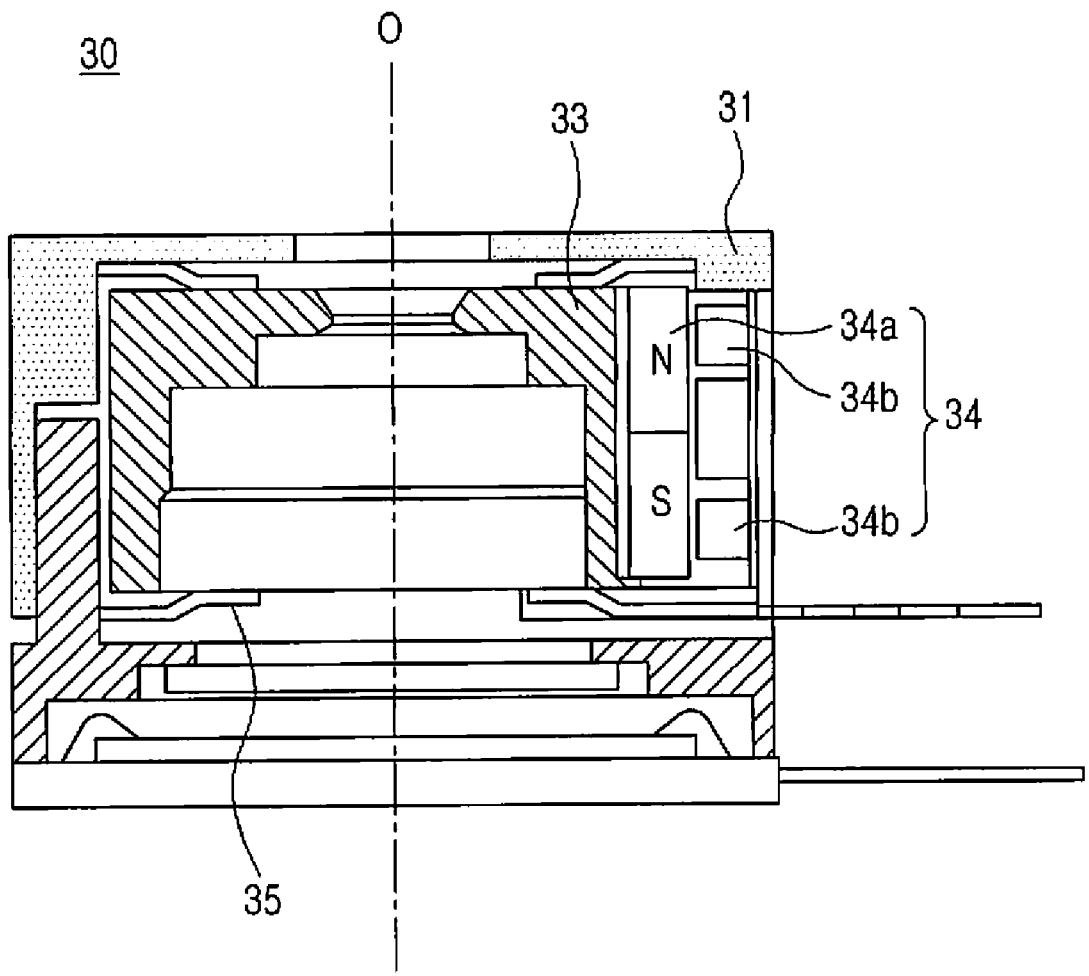
FIG. 3 is a sectional view illustrating a camera lens assembly in accordance with the prior art.

Hereinafter, exemplary embodiments of the present invention will be described with reference to the accompanying drawings. In the following description, various specific definitions found in the following description are provided only to help the general understanding of the present invention, and it is apparent to those skilled in the art that the present invention can be implemented without such definitions.

Referring to FIGS. 4 through 10, a camera lens assembly 100 in accordance with the present invention includes a lens assembly 110, a housing 120 for receiving the lens assembly 110, a driving part 130, and a resilient supporting part 140. The driving part 130 is provided with a housing 120 so as to drive the lens assembly 110 in the direction of an optical axis O. At least one of the supporting parts 140 is coupled with the lens assembly 110, so that the supporting part 140 can support the lens assembly 110 against the housing 120. Further, the supporting part 140 is elastically deformed when the lens assembly 110 moves in the direction of the optical axis O upon activation of the driving part 130, and is designed to restore the lens assembly 110 to an initial position.

Figure 4:
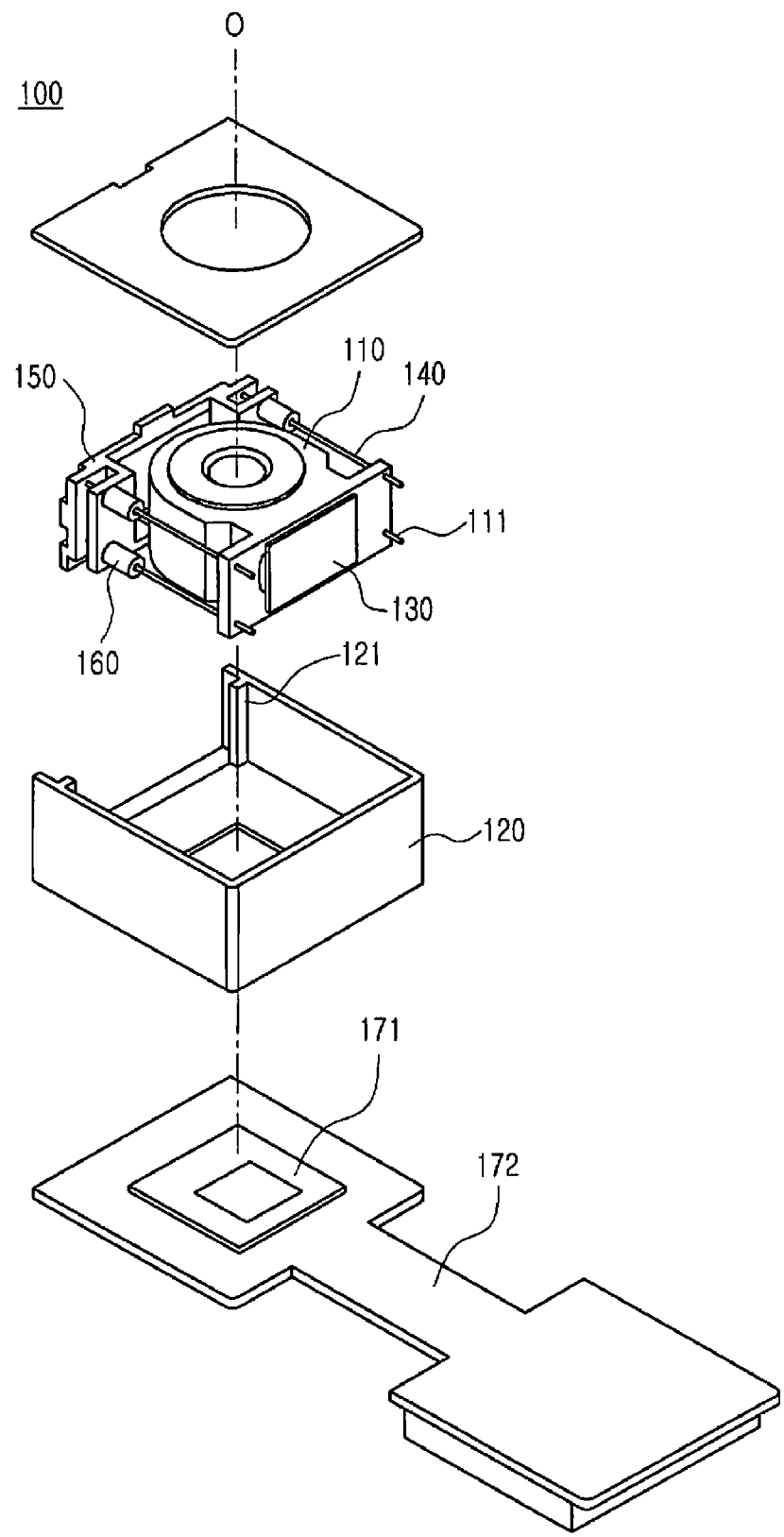
FIG. 4 is a perspective view illustrating a camera lens assembly with the components being separated in accordance with an embodiment of the present invention.
Figure 5:
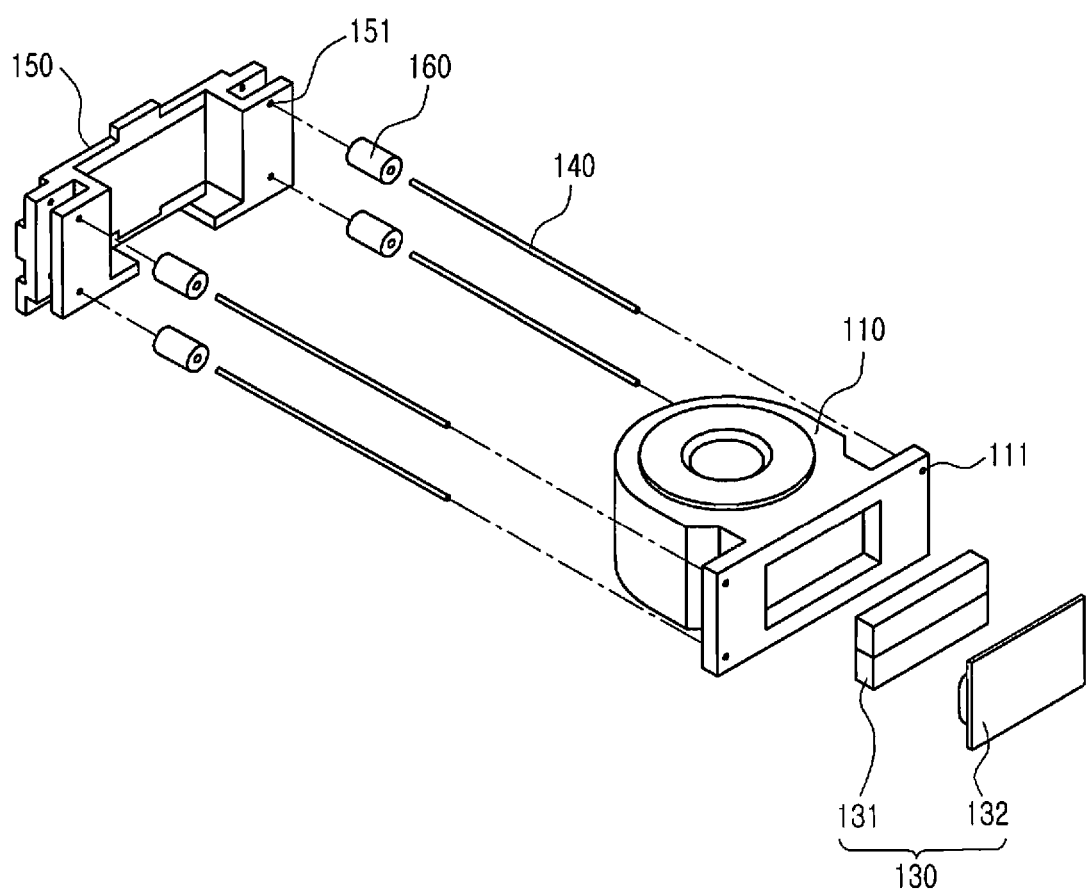
FIG. 5 is an enlarged perspective view illustrating a camera lens assembly with the components being separated in accordance with an embodiment of the present invention.
Figure 7:
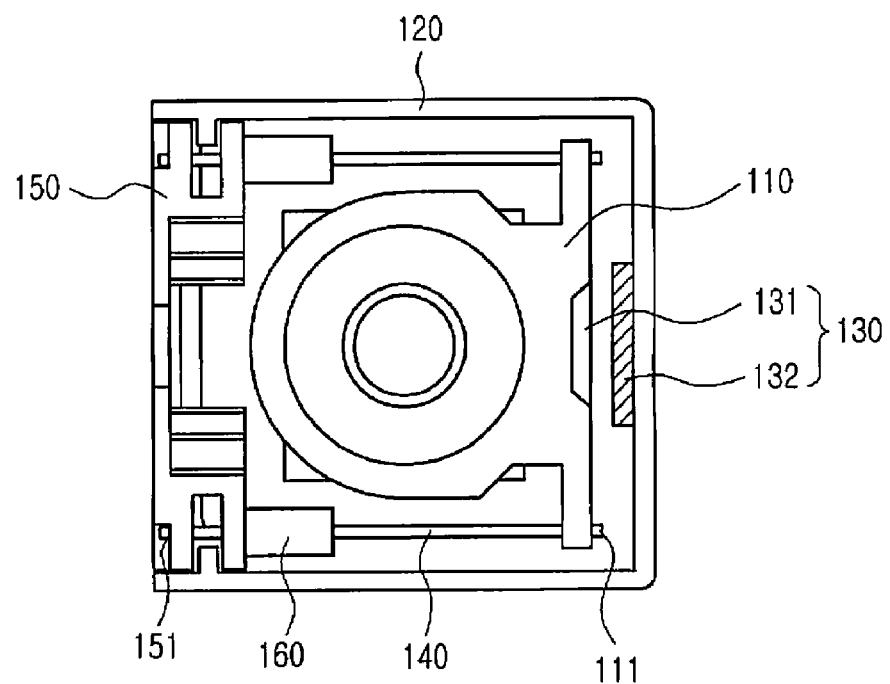
FIG. 7 is a plan view illustrating a camera lens assembly in accordance with an embodiment of the present invention.

As shown in FIGS. 4, 5 and 7, provided on one side of the lens assembly 110 is a guide plate 150 for being secured to one side of the housing 120. A guiding part 121 for engaging the guide plate 150 is provided on the opposite sides of the housing 120, respectively. The lens assembly 110 is located in the initial position within the housing 120 by slidably engaging the guide plate 150 with the guiding part 121, and the guide plate 150 is then secured to the guiding part 121 after locating the lens assembly 110 in the initial position.

The resilient supporting part 140 is coupled with both the other side of the lens assembly 110 and the guide plate 150 as shown in FIGS. 4 and 5.

Referring to FIGS. 5 and 7, the driving part 130 includes a magnetic substance 131 and a coil 132. The magnetic substance 131 is provided on the other side of the lens assembly 110, while the coil 132 is located near the magnetic substance 131 facing the latter in the housing 120. When an electric current is applied to the coil 132, an electrical field generated by the coil 132 and a magnetic field of the magnetic substance 131 cooperate with each other to move the lens assembly 110 in the direction of the optical axis O.

As shown in FIGS. 4, 5, 7 and 8, the resilient supporting part 140 is composed of one or more wire springs. The supporting part 140, i.e., the wire springs, is provided on the opposite sides of the lens assembly 110 and coupled between the guide plate 150 and the other side of the lens assembly 110, so that it can be elastically deformed in the direction of the optical axis O when the lens assembly 110 is moved in the direction of the optical axis O.

As shown in FIGS. 4, 5, and 7, formed on the other side of the lens assembly 110 is one or more mounting holes 111 in which one end of the wire spring 140 is inserted. One or more engaging holes 151 are formed in the guide plate 150 in order to receive the other end of the wire spring 140.

Referring now to FIGS. 5 and 7, one end of the wire spring 140 is inserted in and fixed to the mounting hole 111, and the other end of the wire spring 140 is inserted in and fixed to the engaging hole 151 through an adhesive member. Alternatively, one end of the wire spring 140 is inserted in and fixed to the mounting hole 111, and the other end of the wire spring 140 is inserted in and fixed to the engaging hole 151 through a welding, although other fastening means are contemplated.

As shown in FIGS. 5 and 7, one end of the wire spring 140 is provided with a shock absorbing member 160 to control the shaking of the wire spring 140 by restoring the elastic deformation of the wire spring 140, after the wire spring 140 was elastically deformed.

Figure 8:
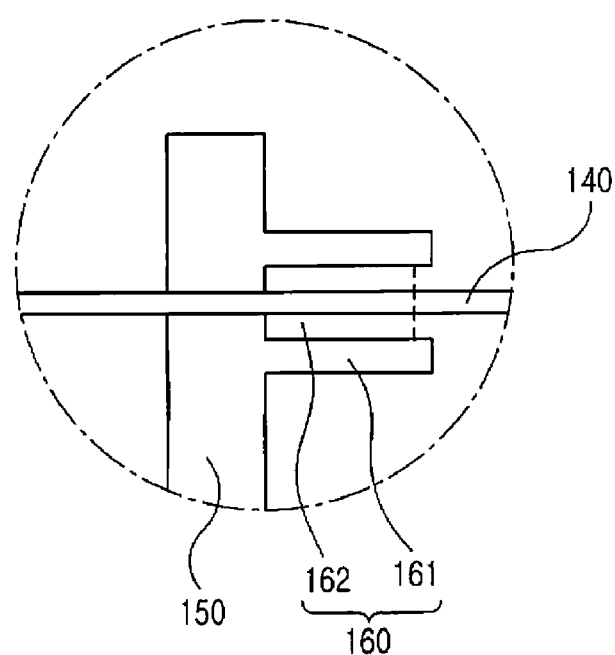
FIG. 8 is an enlarged side view illustrating a shock absorbing member of the camera lens assembly in accordance with an embodiment of the present invention.

Referring FIGS. 7 and 8, the shock absorbing member 160 includes a housing 161 and a viscous member 162. The housing 161 is preferably in the form of a cylinder, and the viscous member 162 is provided within the cylindrical housing 161, for controlling the shaking of the wire spring 140 when the wire spring 140 is elastically deformed. The viscous member 162 is preferably composed of grease or silicone. It is preferable that the shock absorbing member 160 should be centered at the engaging hole 151 and be fixed to the guide plate 150.

Figure 10:
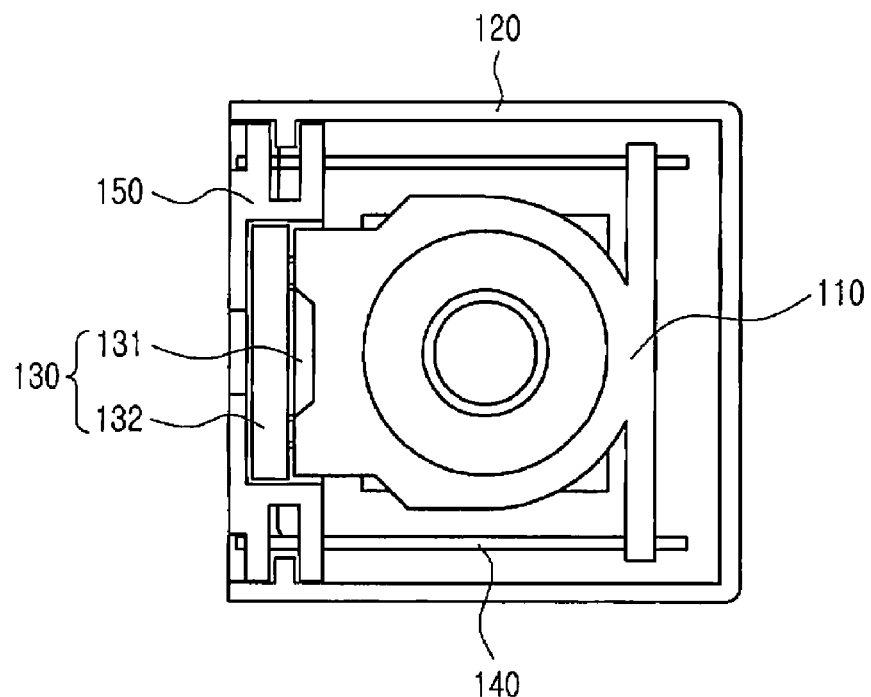
FIG. 10 is a plan view illustrating a state that a driving part is provided toward a guide plate of the camera lens assembly in accordance with an embodiment of the present invention.

As shown in FIGS. 4, 7 and 10, the lens assembly 110 is supported in the housing 120 by means of the wire spring 140. When the electric current is applied to the coil 132, the coil 132 generates an electric field. The electric field generated by the coil 132 and the magnetic field of the magnetic substance 131 cooperate with each other to produce a driving force to move the lens assembly 110. Accordingly, the lens assembly 110 is displaceable back and forth in the direction of the optical axis O. At the same time, the wire spring 140 is elastically deformed by the movement of the lens assembly 110, while the shock absorbing member 160 controls the shaking of the wire spring 140 when the latter is elastically deformed.

Operation of the camera lens assembly having the construction as described above in accordance with a preferred embodiment of the present invention will be described in more detail hereinbelow.

Figure 6:
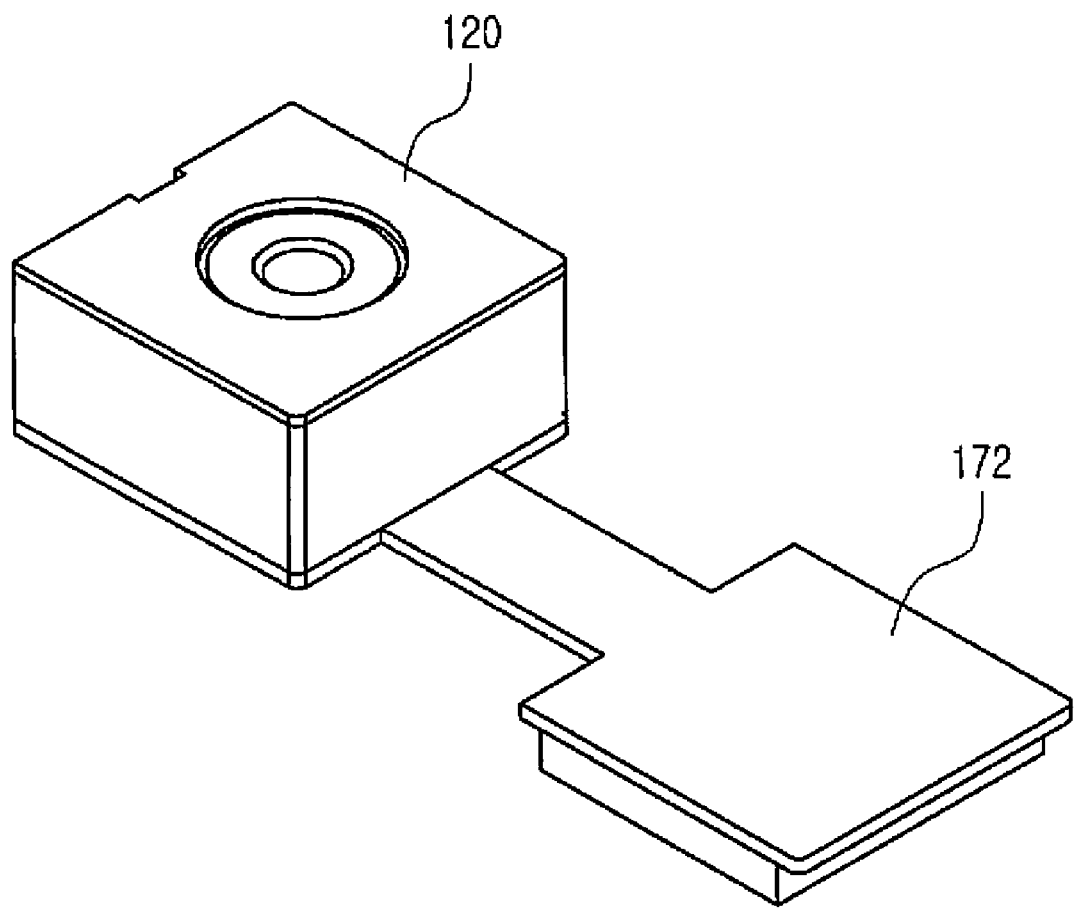
FIG. 6 is a perspective view illustrating a camera lens assembly with the components being assembled in accordance with an embodiment of the present invention.
Figure 9:
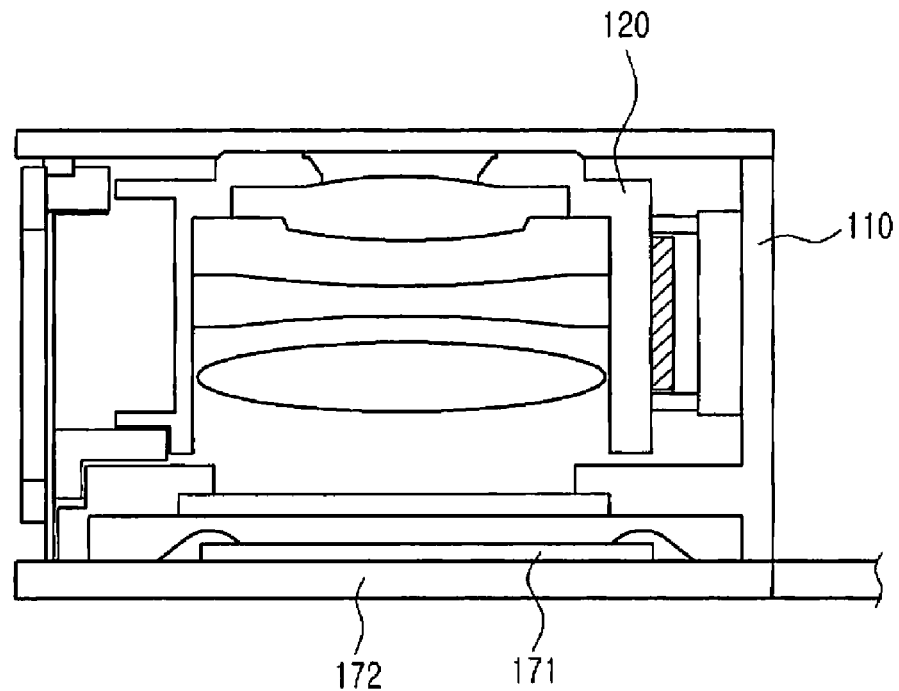
FIG. 9 is a sectional view illustrating a camera lens assembly in accordance with an embodiment of the present invention.

As shown in FIGS. 4, 6, and 9, in the inventive camera lens assembly 100, an image sensor 171 is mounted onto a printed circuit board (PCB) 172 through a wire bonding, which is provided at the lowest position in the direction of the optical axis O and is connected with the main circuit board (not shown) of a portable electronic device. The lens assembly 110 is provided with one or more lenses (not shown) therein. The guide plate 150 is coupled with the lens assembly 110 by means of the guiding part 121 formed at each side of the housing 120. That is, both ends of the guide plate 150 are slidably engaged with the guiding parts 121, respectively to adjust the initial position of the lens assembly 110. When the lens assembly 110 is located in its initial position within the housing 120, the guide plate 150 is secured to the guiding part 121 with adhesives or the like.

As shown in FIGS. 4, 5, and 7, the driving part 130 provided on one side of the lens assembly 110 moves the lens assembly 110 in the direction of the optical axis O. In other words, the driving part 130 includes both the magnetic substance 131 at the other side of the lens assembly and the coil 132 facing the magnetic substance 131 in the housing 120. When the electric current is applied to the coil 132, the electrical field generated by the coil 132 and the magnetic field of the magnetic substance 131 cooperate with each other to produce a driving force to move the lens assembly 110 in the direction of the optical axis O. Alternately, as shown in FIG. 10, the driving part 130 can be provided between the lens assembly 110 and the guide plate 150.

Meanwhile, it is preferable that a hall sensor (not shown) is provided at one side of the housing 120, preferably toward the center of the coil 132 so as to detect the position change of the lens assembly 110 which is moving in the direction of the optical axis O by means of the driving part 130.

Referring to FIG. 9, in a state that the electric current is not yet applied to the coil 132, the lens assembly 110 is supported by the resilient supporting part 140 such that it is positioned at its initial position within the housing 120. The moving distance and direction of the lens assembly 110 are determined in accordance with the value of the electric current applied to the coil 132.

As shown in FIGS. 4, 5, and 7, the resilient supporting part 140 is provided between the lens assembly 110 and the guide plate 150. The supporting part 140 is spaced apart from the image sensor 171 at a predetermined distance and perpendicularly located in the direction of the optical axis O, which allows the lens assembly 110 to maintain a constant gap from the image sensor 171. Preferably, the resilient supporting part 140 is provided on the opposite sides of the lens assembly 110, and more preferably a pair of supporting parts 140 are provided at an upper and lower end of the lens assembly 110, respectively. In other words, it is preferable that four supporting parts 140 are provided between the guide plate 150 and the lens assembly 110. The supporting part 140 supports the lens assembly 110 within the housing 120. When the driving part 130 produces a driving force, the supporting part 140 is elastically deformed in the direction of the optical axis O upon movement of the lens assembly 110.

When the camera lens assembly 100 is to be assembled, the lens assembly 110 is secured to the guide plate 150 by means of the wire spring 140. The guide plate 150 is engaged with the guiding part 121 of the housing 120, thereby adjusting the position of the lens assembly 110 to be set in its initial position. When the lens assembly 110 is located in its initial position, the guide plate 150 is secured to the guiding part 121 through the adhesives. In this way, the lens assembly 110 is always capable of being fixed and supported in the initial position within the housing 120 by the wire spring 140. When the electric current is applied to the coil 132 to generate an electrical field, the electric field of the coil 132 and the magnetic field of the magnetic substance 131 cooperate with each other to move back and forth the lens assembly 110 in the direction of the optical axis O. The wire spring 140 is elastically deformed in the direction of the optical axis O with the movement of the lens assembly 110. The shock absorbing member 160 provided at the other end of the wire spring 140 controls the amount of the shaking of the wire spring 140 to be decreased when the wire spring 140 is being restored after being elastically deformed.

Accordingly, it can be appreciated that the lens assembly 110 of the present invention constantly maintains its initial position in the housing 120 by means of the wire spring 140. In addition, even if the orientation of the camera lens assembly 100 is slightly displaced or an external impact is exerted thereto, the operational reliability of the camera lens assembly 100 can be improved since the lens assembly 110 is always fixed in the initial position while supported by the wire spring 140.

Furthermore, the inventive camera lens assembly 100 is simple in structure and easy to assemble since the wire spring 140 is provided on the opposite sides of the lens assembly 110, respectively.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A camera lens assembly comprising:
a lens assembly;

a housing for receiving the lens assembly;

a driving part retained in the housing for driving the lens assembly in the direction of an optical axis; and one or more resilient supporting parts coupled with the lens assembly for supporting the lens assembly in the housing, wherein the resilient supporting part is elastically deformed when the lens assembly moves in the direction of the optical axis, wherein the resilient supporting part restores the lens assembly to its initial position, and wherein the resilient supporting part is coupled with both a guide plate of one side of the lens assembly and an other side of the lens assembly.

2. The camera lens assembly as recited in claim 1, wherein the guide plate coupled on one side of the housing is engaged on one side of the lens assembly, and a guiding part engaged with the guide plate is provided on one side of the housing, wherein the lens assembly is positioned in an initial position by slidably engaging the guide plate with the guiding part, and wherein the guide plate is secured to the guiding part after the lens assembly is positioned in the initial position.

3. The camera lens assembly as recited in claim 1, wherein the driving part includes a magnetic substance provided on a side of the lens assembly and a coil provided at an end of the housing facing the magnetic substance, and wherein the lens assembly is driven in the direction of the optical axis when the electrical field generated by the coil upon application of an electric current cooperates with the magnetic field of the magnetic substance.

4. The camera lens assembly as recited in claim 2, wherein the resilient supporting part includes at least one wire spring which is coupled between an other side of the lens assembly and the guide plate on opposite sides of the lens assembly, and wherein the wire spring is elastically deformed in the direction of the optical axis when the lens assembly is driven in the direction of the optical axis.

5. The camera lens assembly as recited in claim 4, wherein the lens assembly is formed with at least one mounting hole at one end for securing one end of the wire spring, and wherein the guide plate is formed with at least one engaging hole for securing an other end of the wire spring.

6. The camera lens assembly as recited in claim 5, wherein one end of the wire spring is inserted in and fixed to the mounting hole, and the other end of the wire spring is inserted in and fixed to the engaging hole through an adhesive member.

7. The camera lens assembly as recited in claim 5, wherein one end of the wire spring is inserted in and fixed to the mounting hole, and the other end of the wire spring is inserted in and fixed to the engaging hole through a welding.

8. The camera lens assembly as recited in claim 5, wherein the wire spring is provided with a shock absorbing member at the one end, which controls shaking of the wire spring by restoring elastic deformation when the wire spring is elastically deformed.

9. The camera lens assembly as recited in claim 8, wherein the shock absorbing member includes a cylindrical housing and a viscous member provided within the cylindrical housing.

10. The camera lens assembly as recited in claim 9, wherein the viscous member includes grease or silicone.

11. The camera lens assembly as recited in claim 8, wherein the lens assembly is supported in the housing through the wire spring, the lens assembly includes a coil for generating an electric field when an electric current is applied thereto and a magnetic substance, the electric field by the coil and the magnetic field of the magnetic substance cooperate with each other, the lens assembly is movable back and forth in the direction of the optical axis, the wire spring is elastically deformed upon the movement of the lens assembly, and the shock absorbing member controls the shaking of the wire spring when the wire spring is elastically deformed.

12. A camera lens assembly comprising:

a lens assembly;

a driving part for driving the lens assembly in the direction of an optical axis; and a resilient supporting part for supporting the lens assembly, wherein the supporting part has elasticity capable of moving the lens assembly in the direction of the optical axis according to the activation of the driving part and restores the lens assembly to an initial position, and wherein the resilient supporting part is coupled with both a guide plate of one side of the lens assembly and an other side of the lens assembly.

* * * * *